(12) United States Patent
Trebino

(10) Patent No.: US 7,474,467 B2
(45) Date of Patent: Jan. 6, 2009

(54) ULTRASHORT PULSE COMPRESSOR

(76) Inventor: Rick P. Trebino, 6300 Powers Ferry Rd. #600-345., Atlanta, GA (US) 30339-2919

( * ) Notice: Subject to any disclaimer, the term of this patent is extended or adjusted under 35 U.S.C. 154(b) by 295 days.

(21) Appl. No.: 11/522,660

(22) Filed: Sep. 18, 2006

(65) Prior Publication Data

US 2007/0070485 A1   Mar. 29, 2007

Related U.S. Application Data

(60) Provisional application No. 60/720,533, filed on Sep. 24, 2005.

(51) Int. Cl.
*G02B 27/14* (2006.01)
*H01S 3/08* (2006.01)
(52) U.S. Cl. .................................. 359/637; 372/99
(58) Field of Classification Search ......... 359/402–403, 359/618–619, 629, 633–634, 638, 640, 615, 359/836–837, 833–834, 333, 900; 372/25, 372/99, 102
See application file for complete search history.

(56) References Cited

U.S. PATENT DOCUMENTS 3,915,550 A * 10/1975 Humphrey .................. 359/556
6,081,543 A    6/2000 Liu et al.
6,327,068 B1  12/2001 Silberberg et al.
6,739,728 B2   5/2004 Erbert et al.
2006/0013272 A1* 1/2006 Kopf et al. .................... 372/30

FOREIGN PATENT DOCUMENTS

EP    0 325 832 A1   8/1989
WO   WO 99/39406 A1  8/1999

* cited by examiner

*Primary Examiner*—Scott J Sugarman
*Assistant Examiner*—Dawayne A Pinkney
(74) *Attorney, Agent, or Firm*—Morris, Manning & Martin LLP; Tin Tingkang Xia, Esq.

(57) ABSTRACT

A pulse compressor. In one embodiment, the pulse compressor comprises an optical medium adapted for receiving a beam of light in an incident optical path and dispersing it into its constituent spectral colors to form a dispersed beam of light in an output optical path, where the optical medium is configured such that when an incident beam of light is received by the optical medium, it passes through the optical medium four times, in a back and forth manner, and leaves the optical medium in the form of a corresponding output beam of light.

38 Claims, 6 Drawing Sheets

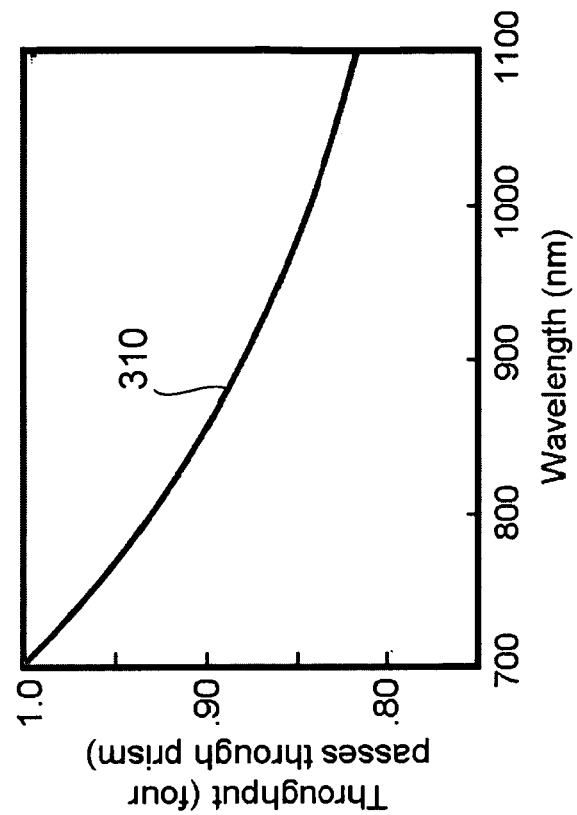
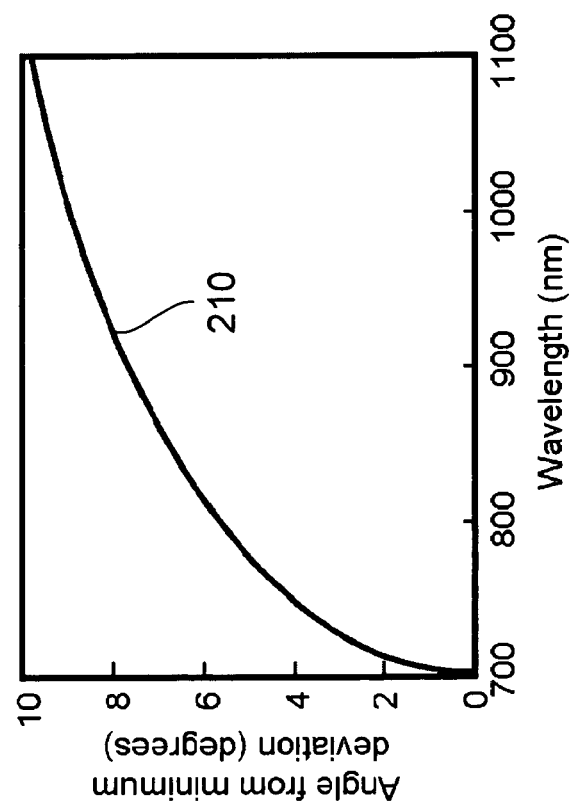
Fig. 3
Fig. 2

ULTRASHORT PULSE COMPRESSOR

CROSS-REFERENCE TO RELATED PATENT APPLICATION

This application claims the benefit, pursuant to 35 U.S.C. §119(e), of U.S. provisional patent application Ser. No. 60/720,533, filed Sep. 24, 2005, entitled "Single-Prism Ultrashort-Laser-Pulse Compressor," by Rick P. Trebino, which is incorporated herein by reference in its entirety.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference. In terms of notation, hereinafter, "[n]" represents the nth reference cited in the reference list. For example, [27] represents the 27th reference cited in the reference list, namely, R. Trebino, "Achromatic N-prism beam expanders: optimal configurations," Appl. Opt. 24(8), p. 1130-1138 (1985).

FIELD OF THE INVENTION

The present invention relates generally to a pulse compressor, and more particularly to an ultrashort pulse compressor using a single prism.

BACKGROUND OF THE INVENTION

Ultrashort laser pulses with pulse lengths from femtoseconds to picoseconds have found broad applications in many fields. For example, ultrashort laser pulses have been applied in the imaging of biomedical and solid-state media [1-9], which reveals subtle details of the media. By tightly focusing even low-energy pulses, ultrahigh intensities can be obtained, allowing ultra-precise micro-machining of materials from metals to dielectrics to the human cornea [10-12]. Ultrashort laser pulses also make possible the time-domain spectroscopic study of important ultrafast events in media from DNA to semi-conductors with unprecedented temporal resolution [13-16]. And by shaping these extremely short bursts of light into potentially very complex waveforms, it allows such exotic possibilities as the control of chemical reactions that cannot otherwise be controlled [17-22]. Essentially all these new techniques, including pulse shaping, operate best with the shortest pulse possible.

However, currently utilized laser pulses are far from optimally short. In practice, the laser pulses are longer than that emitted from the lasers, because of group delay dispersion (hereinafter "GDD"), which is caused when they pass through materials and/or optical elements. The GDD is a ubiquitous phenomenon in ultrafast optics. When a laser pulse propagates through dispersive media and/or optical elements, frequency components of different colors of the pulse emerge at different times, i.e., propagate at different velocities, thereby causing the resultant pulse to be stretched, reducing the pulse's peak power. Because the GDD is nearly always positive for wavelengths commonly available, the frequency components of the redder colors in the pulse always propagate faster than those of bluer colors, so that the redder colors precede the bluer colors in the pulse, in which case the pulse is said to be positively chirped. Chirped laser pulses are almost always undesirable because of the resulting increase of the pulse length and the reduction of the peak power.

The GDD effect may be compensated by using a pulse compressor, which may introduce a negative GDD. A conventional method for introducing a negative GDD is through angular dispersion. Martinez et al. [23] showed that the angular dispersion, regardless of its sign, yields a negative GDD. Therefore, simply propagating a pulse of light through a prism, or diffracting it off a grating, yields the negative GDD, whose magnitude depends on the propagation distance of the pulse of light. Unfortunately, a single dispersive element also introduces distortions in the pulse, such as angular dispersion and spatial dispersion. Adding another prism, identical to, but anti-parallel to the first one, a desired amount of the negative GDD could be achieved with no angular dispersion [24]. However, spatial dispersion remains in the single pair of prisms setup. The spatial dispersion can be compensated with an additional identical pair of prisms.

Referring to FIG. 7, a conventional pulse compressor 700 is shown, which utilizes four prisms 710, 720, 730 and 740 to compensate for the GDD effect. The pair of prisms 710 and 720 and the pair of prisms 730 and 740 are arranged symmetrically, while each pair of prisms 710 and 720 or 730 and 740 are aligned anti-parallel to one another. All the four prisms 710, 720, 730 and 740 are identical. For such an arrangement of the four prisms 710, 720, 730 and 740, when a chirped pulse 750 is input into the pulse compressor 700 through the first prism 710, the pulse compressor 700 outputs a corresponding compressed pulse 760 from the fourth prism 740, with compensations for angular dispersion, the spatial dispersion, and the pulse-front tilt. Additionally, the pulse compressor 700 can also compensate for the material dispersion of the prisms themselves. The pulse compressor 700 has been used in nearly all ultrashort-pulse applications for two decades.

Unfortunately, the pulse compressor 700 is as unwieldy as it is essential. For example, to vary the GDD over a wider range of values that can be obtained by simply translating a prism, the separations between the first and second prisms 710 and 720 and the third and fourth prisms 730 and 740 must be varied and maintained precisely equal, which involves several alignment parameters and an unwieldy set up. Also, the pulse compressor 700 has stringent alignment conditions, and, when not perfectly aligned, it yields an output pulse with residual amounts of spatio-temporal distortions [25] including angular dispersion, pulse-front tilt, spatial chirp, and one-dimensional beam magnification or demagnification that yields an elliptical output beam. It is also very inconvenient to tune in wavelength: if the input wavelength changes, all the prisms must be carefully rotated by the same amount, otherwise all of the above distortions occur. Additionally, to obtain a desired amount of the negative GDD, the prism separations can be quite large, so that the device is bulky.

The four-prism configuration of the pulse compressor 700 may be simplified to a configuration of two prisms through the use of a mirror after the second prism. The two-prism configuration of the pulse compressor is more compact and slightly easier to tune: only two prisms must be rotated by precisely the same amount. However, the two-prism design inherits most of the unwieldiness and propensity for spatio-temporal distortions of the four-prism pulse compressor.

Therefore, a heretofore unaddressed need exists in the art to address the aforementioned deficiencies and inadequacies.

SUMMARY OF THE INVENTION

The present invention, in one aspect, relates to a pulse compressor. In one embodiment, the pulse compressor includes a prism with an apex angle, a (or similarly dispersive optical element). In one embodiment, the prism is made of a dispersive material for dispersing a beam into its constituent spectral along an output optical path. The prism is rotatable around its axis for wavelength tuning.

The pulse compressor further includes a corner cube positioned to face the output surface of the prism. The corner cube receives a beam of light along an incident optical path and returns it in a spatially reverse order to form a reversed beam of light along an output optical path anti-parallel to the incident optical path and translatable for tuning the pulse compressor GDD.

A periscope is adapted for receiving a beam of light along an incident optical path and returning it to form a returned beam of light along an output optical path that is anti-parallel to the incident optical path, wherein the beam of light and the returned beam of light have the same spatial order of colors. In one embodiment, the periscope comprises a pair of mirrors. In another embodiment, the periscope comprises a roof mirror reflector.

The prism, the corner cube and the periscope are arranged in a configuration such that an input beam of light along a first optical path is received and dispersed by the prism to form a first dispersed beam of light that is away from the second surface and along a second optical path towards the corner cube, the first dispersed beam of light along the second optical path is received and returned by the corner cube to form a first reversed beam of light that is along a third optical path towards the second surface, the first reversed beam of light along the third optical path is received and dispersed by the prism to form a second dispersed beam of light that is away from the first surface and along a fourth optical path towards the periscope, the second dispersed beam of light along the fourth optical path is received and directed by the periscope to form a returned beam of light along a fifth optical path towards the first surface, the returned beam of light along the fifth optical path is received and dispersed by the prism to form a third dispersed beam of light that is away from the second surface and along a sixth optical path towards the corner cube, the third dispersed beam of light along the sixth optical path is received and returned by the corner cube to form a second reversed beam of light that is along a seventh optical path towards the second surface, and the second reversed beam of light along the seventh optical path is received and dispersed by the prism to form an output beam of light along an eighth optical path. In one embodiment, the input beam of light comprises one or more pulses of light having a bandwidth of wavelengths. Each of the input beam of light and the output beam of light has a corresponding pulse length, where the pulse length of the output beam of light can be same as or different from that of the input beam of light. Furthermore, the output beam of light has zero additional angular dispersion, zero additional spatio-temporal distortions and unity magnification, relative to the input beam of light.

The pulse compressor further includes a mirror adapted for receiving the beam of light and reflecting it along the first optical path towards the prism. The pulse compressor may also include one or more mirrors arranged such that the input beam and the output beam of light will be collinear accordingly.

In another aspect, the present invention relates to a pulse compressor. In one embodiment, the pulse compressor comprises an optical medium adapted for receiving a beam of light in an incident optical path and dispersing it into its constituent spectral colors to form a dispersed beam of light in an output optical path, wherein the optical medium is configured such that when an incident beam of light is received by the optical medium, it passes through the optical medium four times, in a back and forth manner, and leaves the optical medium in the form of a corresponding output beam of light. In one embodiment, the optical medium is formed of a dispersive material. The optical medium is a prism.

The beam of light includes one or more pulses of light having a bandwidth of wavelengths. Each of the input beam of light and the output beam of light has a corresponding pulse length, where the pulse length of the output beam of light can be same as or different from that of the input beam of light. The output beam of light has zero additional angular dispersion, zero additional spatio-temporal distortions and unity magnification, relative to the input beam of light.

The pulse compressor further includes a beam reversion member positioned on the output optical path of the optical medium for receiving the dispersed beam of light of the optical medium and returning it in a spatially reverse order of spectral colors along an optical path towards the optical medium, wherein the optical path is anti-parallel to the output optical path of the optical medium. The pulse compressor may also include a periscope arranged such that the optical medium is positioned between the periscope and the beam reversion member, where the periscope comprises at least one mirror for returning an incident beam of light.

In yet another aspect, the present invention relates to a method for pulse compression. In one embodiment, the method includes the steps of providing an optical medium capable of receiving a beam of light along an incident optical path and dispersing it into its constituent spectral colors to form a dispersed beam of light along an output optical path, wherein the optical medium is configured such that when an incident beam of light is received by the optical medium, it passes through the optical medium four times, in a back and forth manner, and leaves the optical medium in the form of a corresponding output beam of light; and inputting a beam of light to the optical medium along an incident optical path so as to obtain a corresponding output beam of light. In one embodiment, the optical medium is formed of a dispersive material. The optical medium comprises a prism.

The input beam of light comprises one or more pulses of light having a bandwidth of wavelengths. Each of the input beam of light and the output beam of light has a corresponding pulse length, wherein the pulse length of the output beam of light can be same as or different from that of the input beam of light. Furthermore, the output beam of light has zero additional angular dispersion, zero additional spatio-temporal distortions and unity magnification, relative to the input beam of light.

The method further includes the step of reversing a dispersed beam of light formed by the optical medium in a spatially reverse order to form a reversed beam of light along an optical path towards the optical medium, wherein the optical path is anti-parallel to the output optical path of the optical medium.

In a further aspect, the present invention relates to a pulse compressor. In one embodiment, the pulse compressor includes a prism having at least a first surface and a second surface defining an angle, a, therebetween, an apex edge defined by the first surface and the second surface, and an axis parallel to the first and second surfaces and the apex edge. The prism is adapted for receiving a beam of light in an incident optical path and dispersing it into its constituent spectral colors to form a dispersed beam of light in an output optical path. In one embodiment, the prism is rotatable around its axis for wavelength tuning. Furthermore, the pulse compressor includes a corner cube positioned to face the second surface of the prism and adapted for receiving a beam of light along an incident optical path and returning it in a spatially reverse order of colors to form a reversed beam of light along an output optical path that is anti-parallel to the incident optical path. The corner cube is translatable for tuning of group delay dispersion. Moreover, the pulse compressor includes a beam reflector positioned to face the first surface of the prism and adapted for receiving a beam of light along an incident optical path and returning it to form a returned beam of light along an output optical path that is anti-parallel to the incident optical path, wherein the beam of light and the returned beam of light have the same spatial order of colors. The beam reflector in one embodiment comprises a pair of mirrors. In another embodiment, the beam reflector comprises a roof mirror reflector. The prism, the corner cube and the beam reflector are arranged such that when an input beam of light is incident on the first surface of the prism, it propagates through the prism, the corner cube and the periscope and is output from the first surface of the prism in the form of an output beam of light that has zero added angular dispersion, zero added spatio-temporal distortions and unity magnification, relative to the input beam of light.

Additionally, the device includes a mirror adapted for receiving a beam of light and reflecting it along an optical path towards the first surface of the prism, and a beam periscope adapted for receiving a beam of light and directing it along an optical path towards the mirror.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein:

FIG. 2 shows the rotating angle of the prism versus the wavelength for the single-prism pulse compressor shown in FIG. 1, where the single prism is formed of a highly dispersive material, PBH71;

FIG. 3 shows the throughput of a beam of light after four passes versus the wavelength for the single-prism pulse compressor shown in FIG. 1, where the single prism is formed of a highly dispersive material, PBH71;

DETAILED DESCRIPTION OF THE INVENTION

Figure 1:
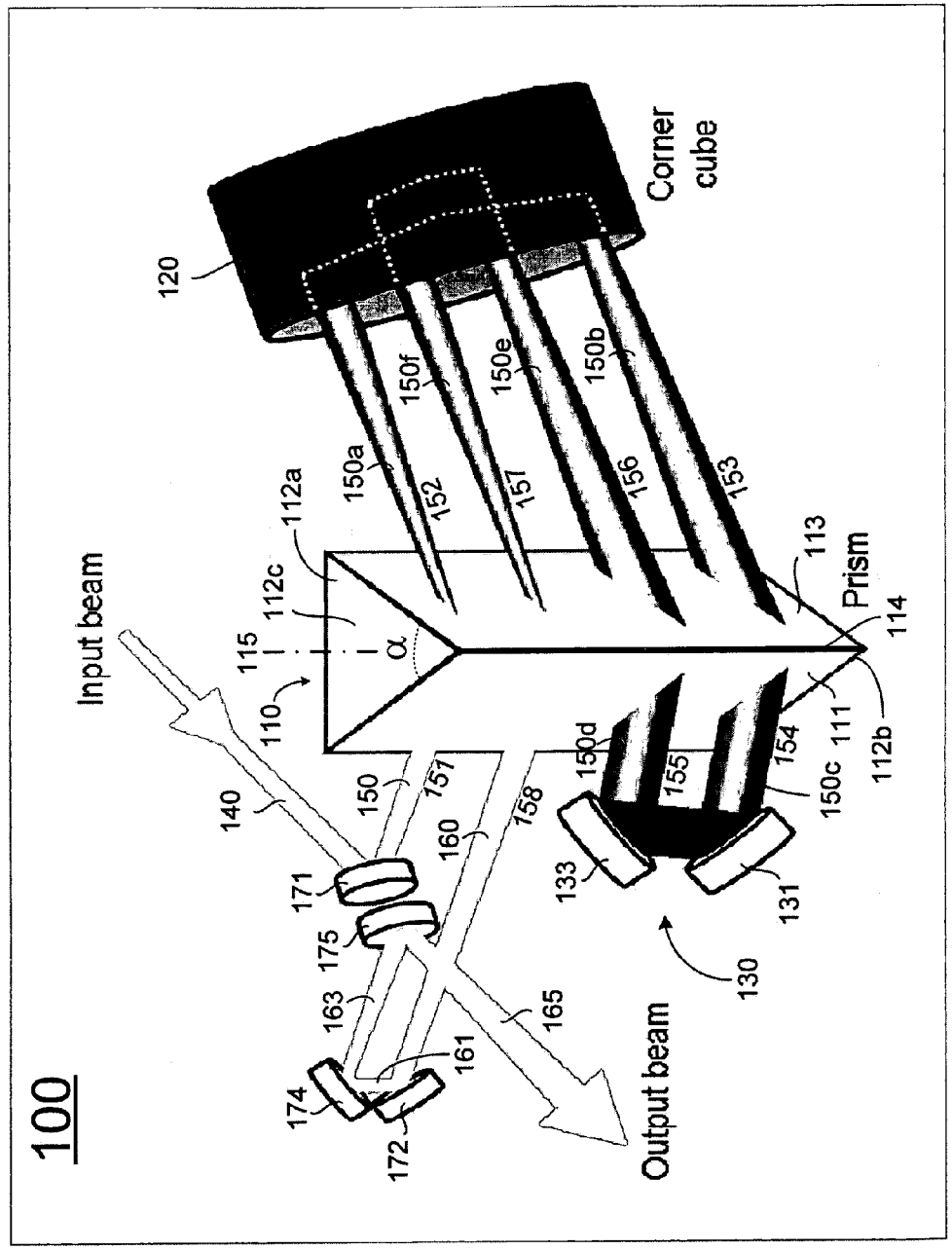
FIG. 1 shows schematically a perspective view of a single-prism pulse compressor according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which has no influence on the scope of the invention. Additionally, some terms used in this specification are more specifically defined below.

Definitions

The terms used in this specification generally have their ordinary meanings in the art, within the context of the invention, and in the specific context where each term is used.

Certain terms that are used to describe the invention are discussed below, or elsewhere in the specification, to provide additional guidance to the practitioner in describing the apparatus and methods of the invention and how to make and use them. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to various embodiments given in this specification. Furthermore, subtitles may be used to help a reader of the specification to read through the specification, which the usage of subtitles, however, has no influence on the scope of the invention.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "group delay" refers to a measure for the time delay experienced by narrow-band light pulse in an optical element and/or device. The group delay of an optical element and/or device is usually defined as the derivative of the phase delay with respect to the angular frequency. The group delay will be different for light pulses with different colors or wavelengths when they propagate through materials.

The term "group delay dispersion" and its acronym "GDD", as used herein, refer to the frequency dependency of the group delay in an optical element and/or device. The group delay dispersion of an optical element and/or device is defined as the derivative of the group delay of the optical element and/or device with respect to the angular frequency. The GDD of an optical element and/or device can be positive or negative, depending upon the material and configuration of the optical element and/or device. With a negative GDD, light with higher frequencies (shorter wavelengths) takes less time to travel through the optical element and/or device than light with lower frequencies (longer wavelengths) does. With a positive GDD, it is the other way around.

Overview of the Invention

The widespread use of two-prism and four-prism pulse compressors has been limited by their size and unwieldiness, unease-to-tuning in wavelength and dispersion, and propensity for spatio-temporal distortions. Therefore, a simple and compact pulse compressor would gain great relevance in ultrashort pulse applications and related fields. The present invention, among other things, provides such a pulse compressor that only uses a single prism. The single-prism pulse compressor, among other things, possesses unique features absent in the conventional two-prism and four-prism pulse compressors. These unique features include, but are not limited to, (i) a compact size: for example, the invented pulse compressor, by design, is about a factor of two (four) smaller in size than the two-prism (four-prism) pulse compressor; (ii) single-knob wavelength tuning; (iii) single-knob GDD tuning over a broad range of values; (iv) zero spatio-temporal distortions; (v) unity magnification; and (vi) maintenance of collinear input and output beams despite potential device movement (i.e., a high tolerance to vibrations).

The description of the single-prism pulse compressor in connection with other unique features of the present invention will be made as to the embodiments of the present invention in conjunction with the accompanying drawings in FIGS. 1-5.

Referring to FIG. 1, a single-prism pulse compressor 100 is shown according to one embodiment of the present invention. Briefly, the pulse compressor 110 has a corner cube 120 placed after a single prism 110, which yields a beam inversion and so results in effectively inverting the prism (actually inverting the beam of light) on its return pass. Then, by using a periscope 130, which changes only the height of the beam, not the order of colors, the beam of light returns after passing through the prism 110 and the corner cube 120. The returned beam of light passes the prism 110 and the corner cube 120 again, resulting in an output beam of light that is compressed relative to the input beam of light.

More specifically, as shown in FIG. 1, the prism 110 has a first end 112a, an opposite, second end 112b, and a body portion 112c defined therebetween. The body portion 112c has at least a first surface 111 and a second surface 113 defining an angle, α, therebetween. The prism 110 further has an apex edge 114 defined by the first surface 111 and the second surface 113, and an axis 115 parallel to the first surface 111 and the second surface 113, and the apex edge 114. Each of the first surface 111 and the second surface 113 of the prism 110 may be coated with an anti-reflection material. The prism in general is in the form of a triangular prism. Prisms, diffraction gratings, or combinations of prisms and/or gratings, or any other dispersive component, with other geometric forms can also be utilized to practice the present invention.

The prism 110 is made of, preferably, a dispersive material. The prism 110 is adapted for receiving a beam of light along one optical path and dispersing it into its constituent spectral colors to form a dispersed beam of light along another optical path. In the prism 110, shorter-wavelength components of light are bent more than longer-wavelength components of light, as shown in FIG. 1. For example, at the exit face of the prism 110, the red light of the dispersed beam of light is proximate to the apex 114 of the prism 110, while the blue light, which has a wavelength shorter than that of the red light, is distal to the apex 114 of the prism 110. The prism 110 is rotatable around its axis 115 for wavelength tuning.

The corner cube 120 is positioned to face the second surface 113 of the body portion 112c of the prism 110 and adapted for receiving a beam of light and returning it in a spatially reverse order to form a reversed beam of light anti-parallel to the incident optical path of the beam of light. In other words, the corner cube 120 performs beam inversion. For example, when a color dispersed beam of light having a color order from red to blue is incident into the corner cube 120 along an incident optical path, it will be returned as a beam of light having a color order from blue to red along an optical path that anti-parallel to the incident optical path. The corner cube 120 is translatable for tuning of group delay dispersion.

The periscope 130 is positioned to face the first surface 114 of the body portion 112c of the prism 110 and adapted for receiving a beam of light along one optical path and directing it to form a returned beam of light along an optical path that is parallel to the optical path of the beam of light, but propagating in an opposite direction. The returned beam of light changes only the height of the beam of light, or more precisely, the cross-section dimension of the beam of light, but not the order of colors of the beam of light. As shown in FIG. 1, the periscope 130 has a pair of mirrors 131 and 133 arranged with an angle therebetween and facing each other. Alternatively, the periscope 130 may have a roof mirror reflector.

Furthermore, the pulse compressor 100 has a mirror 171 adapted for receiving an input beam of light 140 emitted from a source of light and reflecting (steering) the input beam of light into a beam of light 150 along the first optical path 151 towards the prism 110. The pulse compressor 100 also has a collimating means including a first mirror 172, a second mirror 174 and a third mirror 175 arranged such that when the input beam of light 140 or the pulse compressor 100 moves, the input beam of light 140 and the output beam of light 165 remain collinear accordingly.

In operation, a beam of light 150 is input into the pulse compressor 100, propagates along an optical path in the pulse compressor 100 that is sequentially through the prism 110, the corner cube 120, the prism 110, the periscope 130, the prism 110, the corner cube 120 and the prism 110, and is output from the pulse compressor 100 in the form of an output beam of light 160 that has zero (or no) additional angular dispersion, zero (or no) additional spatio-temporal distortions and unity magnification, relative to the input beam of light 150.

More specifically, when a beam of light 150 is input along a first optical path 151, it is received and dispersed by the prism 110 to form a first dispersed beam of light 150a that is away from the second surface 114 and along a second optical path 152 towards the corner cube 120. Then the first dispersed beam of light 150a along the second optical path 152 is received and returned by the corner cube 120 to form a first reversed beam of light 150b along a third optical path 153 towards the second surface 114 of the body portion 112c of the prism 110. Next, the first reversed beam of light 150b along the third optical path 153 is received and dispersed by the prism 110 to form a second dispersed beam of light 150c that is away from the first surface 111 and along a fourth optical path 154 towards the periscope 130. The second dispersed beam of light 150a along the fourth optical path 154 is received and directed by the periscope 130 to form a returned beam of light 150d along a fifth optical path 155 towards the first surface 111 of the body portion 112c of the prism 110. The returned beam of light 150d along the fifth optical path 155 is received and dispersed by the prism 110 to form a third dispersed beam of light 150e that is away from the second surface 113 and along a sixth optical path 156 towards the corner cube 120. The third dispersed beam of light 150e along the sixth optical path 156 is received and returned by the corner cube 120 to form a second reversed beam of light 150f along a seventh optical path 157 towards the second surface 113 of the body portion 112c of the prism 110. Finally, the second reversed beam of light 150b along the seventh optical path 157 is received and dispersed by the prism 110 to form an output beam of light 160 that is away from the first surface 111 and along an eighth optical path 158.

The input beam of light 150 may have one or more pulses of light having a bandwidth of wavelengths. Each of the input beam of light 150 and the output beam of light 160 has a corresponding pulse length. According to the present invention, the pulse length of the output beam of light 160 can be same as or different from that of the input beam of light 150. In other words, the current invention can compress the pulse in time, but it can also expand it or leave it the same in length. Furthermore, the output beam of light 160 has zero (or no) additional angular dispersion, zero (or no) additional spatio-temporal distortions and unity magnification, relative to the input beam of light 150, as shown below.

Additionally, the invented single prism pulse compressor 100 is very easy to tune. For example, for wavelength tuning, it can be performed by simply rotating the prism 110 around its axis 115. Moreover, translating the corner cube 120 results in the variation of the GDD, typically, from a large negative value, such as $-10,000$ fs$^2$ to a small positive value, such as +1000 fs$^2$.

According to the present invention, the corner cube 120 leaves the polarization of the input beam (pulse) of light intact. The periscope 130 used at the output changes only the beam height and thus does not affect the polarization of the input beam of light either. However, the last mirror 175 used to make the output beam of light 165 collinear to the input beam of light 140 could, in principle, rotate the polarization slightly. This can be avoided by selecting the last mirror 175 having a highly reflective surface as the first mirror 171 has. This simply requires a highly reflective coating on one surface and an anti-reflective one on the other of the mirror. Hence, this mirror becomes an effectively "infinitesimally" thin mirror. This way, the pulse compressor 100 yields the output beam of light having the same polarization as the input beam of light 140. AR-coated beam-steering compensator plates 172 and 174 could then be used to restore input-beam and output-beam collinearity. According to one embodiment of the present invention, the polarization rotation caused by the pulse compressor 100 was measured to be less than 0.31 degrees.

Figure 6:
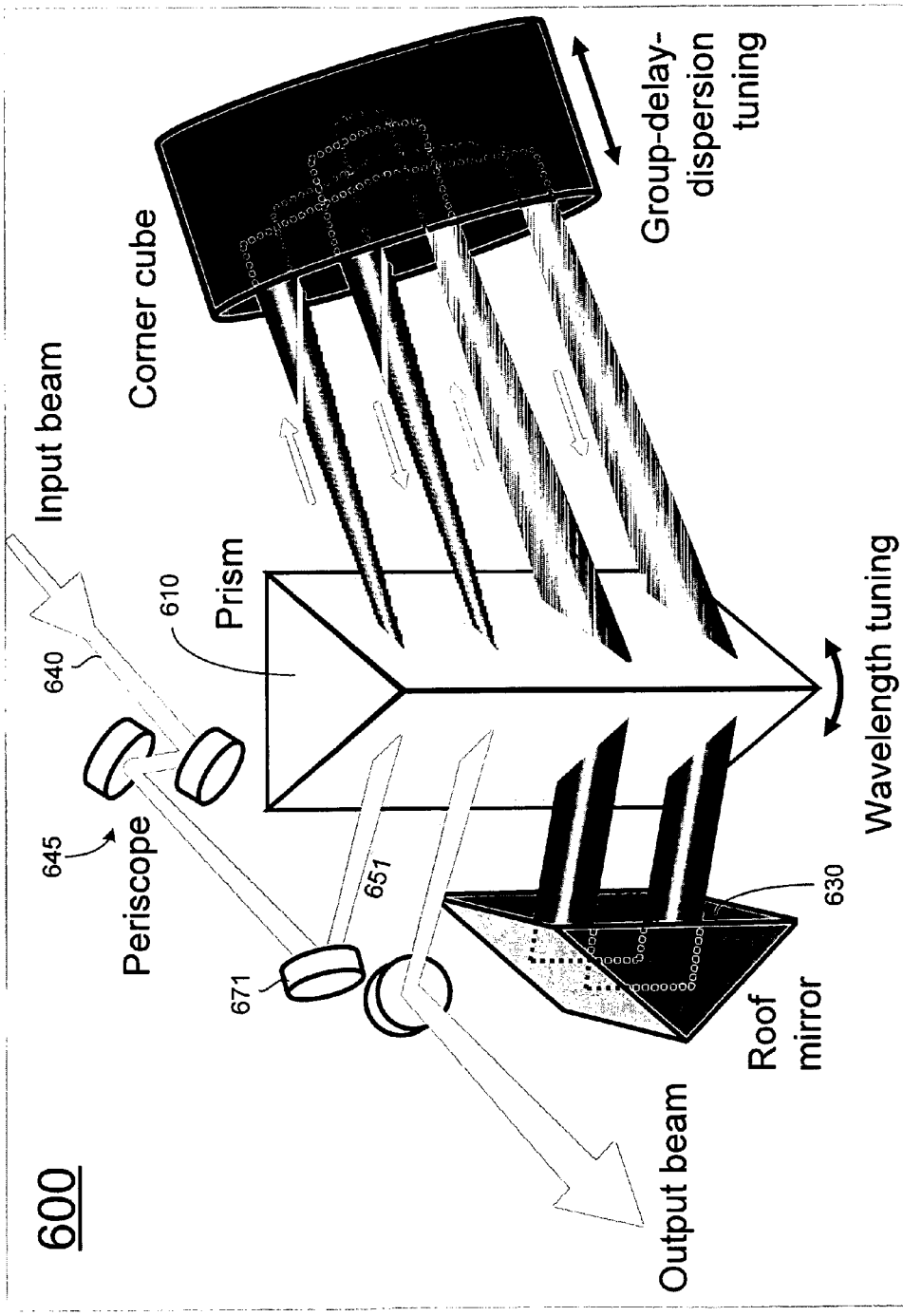
FIG. 6 shows schematically a perspective view of a single-prism pulse compressor according to one embodiment of the present invention.
Figure 7:
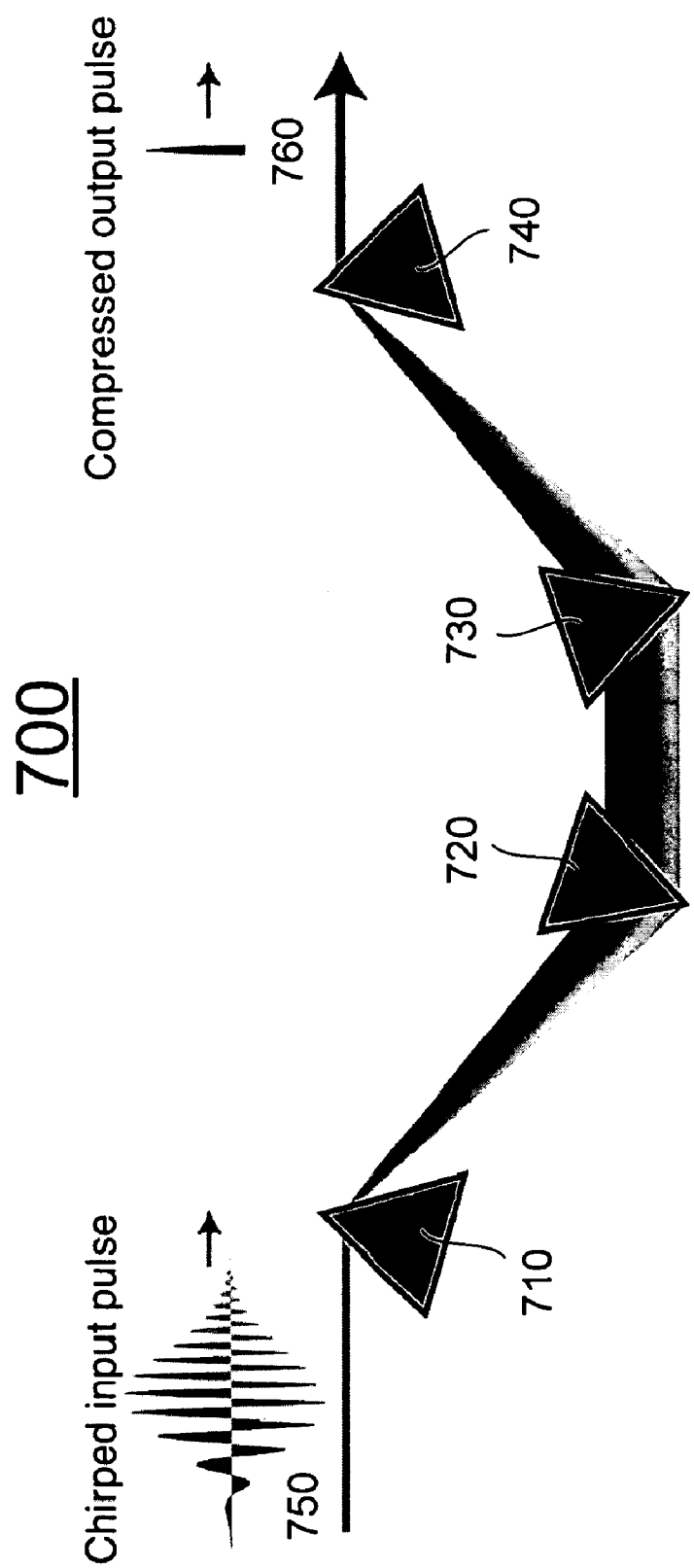
FIG. 7 shows a conventional four-prism pulse compressor.

Alternatively, a beam periscope may be placed before the first optical path through the prism for yielding zero polarization rotation. Referring to FIG. 6, a pulse compressor 600 according to another embodiment of the present invention is shown. In this embodiment, the pulse compressor 600 has a beam periscope 645 adapted for receiving an input beam of light 640 emitted from a source of light and directing it towards a mirror 671. Once the mirror 671 receives the beam of light, it reflects it along a first optical path 651 towards the prism 610. Such an arrangement of the beam periscope 645 ensures no polarization rotation of the input beam of light 640 to be yielded. Additionally, according to this embodiment, a roof mirror 630 is utilized for for receiving a beam of light along an incident optical path and returning it to form a returned beam of light along an output optical path that is anti-parallel to the incident optical path, wherein the beam of light and the returned beam of light have the same spatial order of colors.

The pulse compressor, according to the present invention, includes all the positive features of two-prism and four-prism pulse compressors. Furthermore, the pulse compressor has several important advantages, which are lacking in the two-prism and four-prism pulse compressors. Like the two-prism and four-prism pulse compressors, the pulse compressor achieves all passes through the prism near its apex (tip), thereby minimizing the positive GDD due to the prism material. But unlike them, the pulse compressor is significantly easier to align, due to the corner cube, which automatically returns the beam anti-parallel to the beam entering it. Also, the pulse compressor can be GDD-tuned over a broad range of values by translating only the corner cube (and it can also use prism translation into or out of the beam for fine-tuning if desired). The pulse compressor achieves wavelength tuning by simply rotating the single prism. The pulse compressor is also very compact: because the beam double-passes the prism corner-cube path, the pulse compressor is about half the size of two-prism design and one fourth the size of four-prism design. The pulse compressor precisely compensates for the spatio-temporal distortions (spatial dispersion and pulse-front tilt) often occurring in beams out of pulse compressors. The pulse compressor automatically yields zero additional angular dispersion. And the pulse compressor automatically yields unity magnification.

Another aspect of the present invention provides a method of pulse compression of using an optical medium, such as a single prism configuration disclosed in FIG. 1. In one embodiment, the method includes the steps of providing an optical medium capable of receiving a beam of light along an incident optical path and dispersing it into its constituent spectral colors to form a dispersed beam of light along an output optical path, where the optical medium is configured such that when an incident beam of light is received by the optical medium, it passes through the optical medium four times, in a back and forth manner, and leaves the optical medium in the form of a corresponding output beam of light; and inputting a beam of light to the optical medium along an incident optical path so as to obtain a corresponding output beam of light. In one embodiment, the optical medium is formed of a dispersive material. The optical medium comprises a prism. The input beam of light comprises one or more pulses of light having a bandwidth of wavelengths. Each of the input beam of light and the output beam of light has a corresponding pulse length, where the pulse length of the output beam of light is not greater than that of the input beam of light. Furthermore, the output beam of light has zero angular dispersion, zero spatio-temporal distortions and unity magnification, relative to the input beam of light.

The method further includes the step of reversing a dispersed beam of light formed by the optical medium in a spatially reverse order to form a reversed beam of light along an optical path towards the optical medium, wherein the optical path is anti-parallel to the output optical path of the optical medium.

These unique features make the single-prism pulse compressor ideal for essentially all ultrafast optical applications, and especially for multi-photon imaging and nano-machining.

These and other aspects of the present invention are further described below.

EXAMPLES AND IMPLEMENTATIONS OF THE INVENTION

Without intent to limit the scope of the invention, exemplary methods and their related results according to the embodiments of the present invention are given below. Note again that titles or subtitles may be used in the examples for convenience of a reader, which in no way should limit the scope of the invention. Moreover, certain theories are proposed and disclosed herein; however, in no way they, whether they are right or wrong, should limit the scope of the invention.

According to the present invention, one of the greatest advantages of the single-prism pulse compressor is the ease of wavelength tuning. The pulse compressor can be built and optimized for one wavelength of an input beam (pulse) of light. When the wavelength of the input beam of light is changed, the pulse compressor needs to be tuned only simply by rotating the single prism along its axis accordingly. For the pulse compressor, when the prism is rotating along its axis, the beam path through the pulse compressor remains intact. That is, the wavelength tuning for the single-prism pulse compressor is performed with a single knob to rotate the single prism. No gears or belts are necessary to maintain proper angles of two or more prisms as required in the conventional two or more prism pulse compressor. FIG. 2 shows the required rotating angle 210 of the single prism for the wavelength tuning of the single-prism pulse compressor when the input wavelength is changed, where the single prism is formed of a highly dispersive material, PBH71. Note that, for the pulse compressor designed for the angle of minimum deviation at a certain wavelength, it can be tuned only to longer wavelengths by rotating the prism in either direction. According to the embodiment employed for showing the wavelength tuning graph of FIG. 2, the pulse compressor is designed at an input wavelength of about 700 nm. When the prism is rotated, the input wavelength for the pulse compressor tends to be longer. As shown in FIG. 2, when the input wavelength is tuned to be about 1100 nm, the prism needs to be rotated, relative to its initial position, nearly 10° along its axis.

Although the wavelength tuning of the pulse compressor is very easy, there are several subtleties associated with tuning (as is also the case for all other pulse compressors) must be considered, which include the magnification, the angular dispersion at the output, the spatial dispersion and the pulse-front tilt at the output, and the throughput of the pulse compressor.

Magnification: As the input wavelength for a pulse compressor is tuned by rotation of the prism, each pass of a beam of light through the prism involve the incidence and exit angles, other than Brewster's angle, of the beam of light into and from the prism. Although the one-dimensional magnification of a beam of light through a prism is unity when its incidence and exit angles are equal, i.e., Brewster's angle for an ideal pulse compressor, this is not the case for other incidence angles. Indeed, when an incidence angle of a beam of light into a prism exceeds its exit angle from the prism, certain one-dimensional magnification of the beam of light occur, while demagnification of the beam of light occurs if the incidence angle of the beam of light into the prism is less than its exit angle from the prism. Thus, for the case of a beam of light incident into a prism at a non-Brewster angle, each pass of the beam of light through the prism yields certain one-dimensional magnification or demagnification in the beam of light. This problem exists in all prism and grating pulse compressors, and it must be addressed in the alignment procedure.

In a single-prism pulse compressor according to the present invention, as the wavelength is tuned, the first pass of the beam of light through the prism introduces a magnification, say, for example, $M_1$. However, after the beam of light returns from the corner cube, the beam of light retraces its path and experiences a demagnification, $M_2$, by exactly the same amount because the input/output angles are reversed as compared with the first pass of the beam of light, i.e., $M_2=1/M_1$. As a result, if $M_i$ is the magnification after the i-th pass of the beam of light through the prism, it satisfies the relation of:

$$M_1 = \frac{1}{M_2} = M_3 = \frac{1}{M_4} = M \quad (1)$$

Multiplying all four magnifications together yields the overall magnification of the pulse compressor, which is unity. Therefore, the single-prism pulse compressor automatically retains unity magnification as the wavelength is tuned. According to embodiments of the present invention, the magnification of the single-prism pulse compressor is experimentally measured to be about 1.013±0.02.

Angular Dispersion: It is also crucial for a pulse compressor in operation that the output angular dispersion remain zero as the GDD and/or the wavelength is tuned.

According to the present invention, translating the corner cube of the pulse compressor varies the GDD of the pulse compressor, but does not affect any incidence and exit angles of the beam of light into and from the prism of the pulse compressor angles, that is, if the dispersion of the pulse compressor is zero for one value of the GDD, it will be for them all when translating the corner cube. But the variation of the prism angle with wavelength-tuning could cause the output angular dispersion to vary, as it can easily be in conventional pulse compressors. The angular dispersion introduced by a prism depends on which optical path the beam of light propagates through it. If a prism has a dispersion D and magnification M in the forward direction, it has a dispersion MD in the reverse direction. Thus, the angular dispersion added on each pass of the beam of light through the prism is:

$$MD_1 = -D_2 = -MD_3 = D_4 = MD \quad (2)$$

where the minus signs take into account the beam flips.

Unfortunately, the total dispersion of a four-prism sequence with non-Brewster incidence angles is described by a complex formula in terms of the prism apex and incidence angles, and so it is difficult to see immediately what the total dispersion of the pulse compressor would be. However, as reported by the inventor in [27], the total dispersion of an arbitrary sequence of prisms is obtained in terms of only the prisms' dispersions and magnifications: the total dispersion is the sum of the individual dispersions, each weighted by the reciprocal of the total magnification that follows it. Therefore, the angular dispersion at the output of the single-prism pulse compressor according to the present invention is in the form of:

$$D_{tot} = \frac{D_1}{M_2 M_3 M_4} + \frac{D_2}{M_3 M_4} + \frac{D_3}{M_4} + D_4, \quad (3)$$

since a beam of light passes through the single prism four times before it is output, which is corresponding to a four-prism sequence system. Substituting the values for the dispersion and magnification given above gives the total dispersion of the single-prism pulse compressor to be zero, independent of the prism angle.

Spatial Chirp and Pulse-Front Tilt: The symmetry of the optical paths of a beam of light propagating through the invented pulse compressor implies that the spatial chirp is zero. This is because the magnitude of the dispersion of the beam of light through the prism each time is the same, as in the ideal case. Also, when the spatial chirp and angular dispersion of a beam of light are zero, the pulse-front tilt must also be zero.

In one embodiment, the spatial chirp and pulse-front tilt at the output of the pulse compressor were measured using GRENOUILLE (Swamp Optics, Inc. Atlanta, Ga.) [28, 29]. The shear in the GRENOUILLE trace, indicating spatial chirp, was about 0.05, essentially at the detection limit. The pulse-front tilt angle of a beam of light passing through the invented pulse compressor was measured to be less than 16 μrad. However, for a conventional two-prism or four-prism pulse compressor, typically about 1 degree misalignment in a prism causes a pulse-front tilt angle larger than 2000 μrad [25].

Throughput: The throughput of the pulse compressor is evaluated as the wavelength is tuned. In order to minimize the Fresnel reflection losses on prism surfaces, the prism may be built and used in Brewster's configuration. This way, if the input beam of light is horizontally polarized, there are no reflection losses. Brewster's configuration, is however, satisfied only for a particular wavelength. Therefore, as the prism is rotated for wavelength tuning, the throughput of the pulse compressor decreases. In one embodiment, the Fresnel losses are calculated which remain reasonably small when the pulse compressor is tuned from 700 nm (at Brewster's) up to 1100 nm. FIG. 3 shows the calculated throughput 310, as a function of the input wavelength. Note that the throughput may be optimized at some other wavelength, if desired. The prism surface may also be coated with anti-reflection materials, in order to further increase the throughput. With the use of dielectric mirrors everywhere except for the corner cube, an overall throughput of about 75% is obtained in a pulse compressor according to one embodiment of the present invention.

The size of the single-prism pulse compressor according to the present invention is determined by a desired amount of the negative GDD and a type of the single prism used, which is similar to two-prism and four-prism pulse compressors. However, for a given GDD and prism material, the single-prism pulse compressor is one half or one fourth the size of the two-prism and four-prism pulse compressors, respectively.

Figure 4:
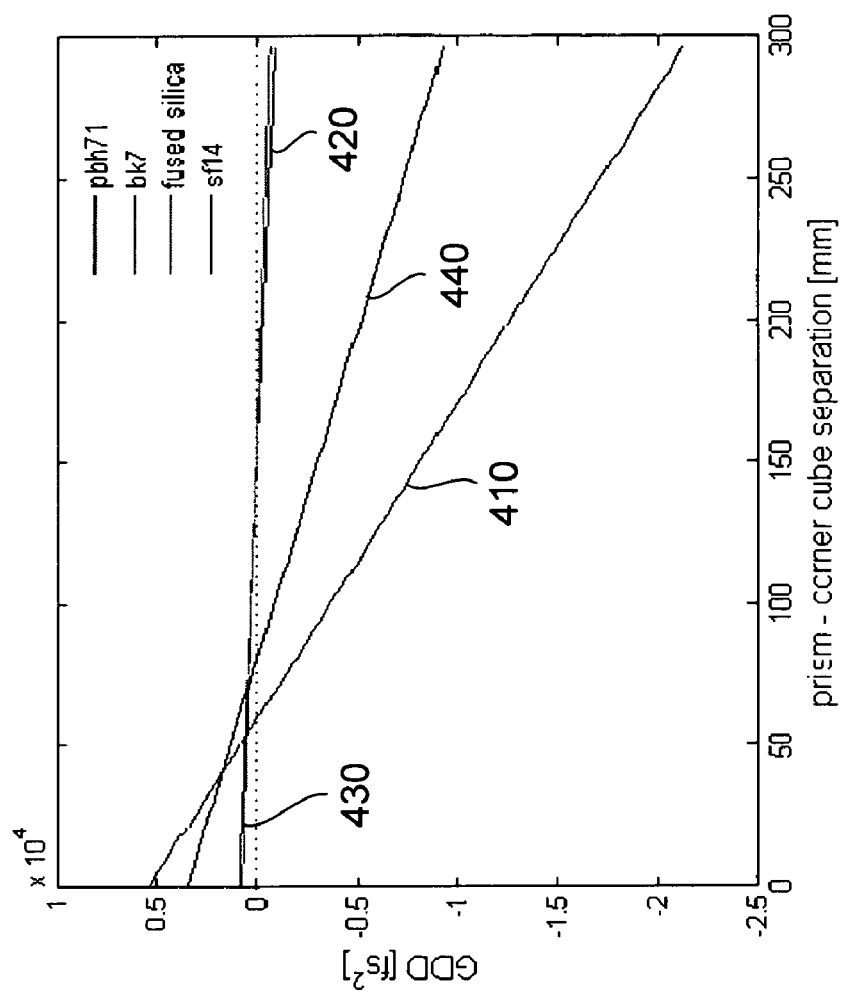
FIG. 4 shows the output GDD versus the separation of the prism and the corner cube separation for the pulse compressor shown in FIG. 1 but made from four (4) different materials, where the total propagation distance of the beam of pulses through the single prism is about 20 mm.

Referring to FIG. 4, the output GDD of a beam of light as a function of the prism-corner cube separation in the single-prism pulse compressor is shown according to one embodiment of the present invention. Curves 410, 420, 430 and 440 are the output GDD for the prism made of PBH71, BK7, fused silica and SF14, respectively. It is shown that the prism made of a dispersive material, such as SF14 or PBH71 (O'Hara Equivalent of SF66), provides significantly higher negative GDD over relatively small separations of the prism and the corner cube in single-prism pulse compressor. Therefore, the dispersive prism makes the invented pulse compressor even more compact. Other types of dispersive materials of prisms can also be utilized to practice the present invention.

However, when the bandwidth of the beam of light is too wide, the use of dispersive prisms may have disadvantageous, where higher-order dispersions may become significant. It is known that a third order dispersion, for example, may cause satellite pulses in the time domain. For a broadband beam of light, using a less dispersive prism can solve the problem, even though it increases the size of the pulse compressor.

Two single-prism pulse compressors according to the present invention were built for evaluation. One uses a PBH71 prism, for pulses up to about 35 nm bandwidth, and the other is with a BK7 prism, for pulses with larger bandwidths. The corner cube used in the pulse compressors is made using silver coated mirrors (PROSystems, Inc., Keameysville, W. Va.).

Figure 5:
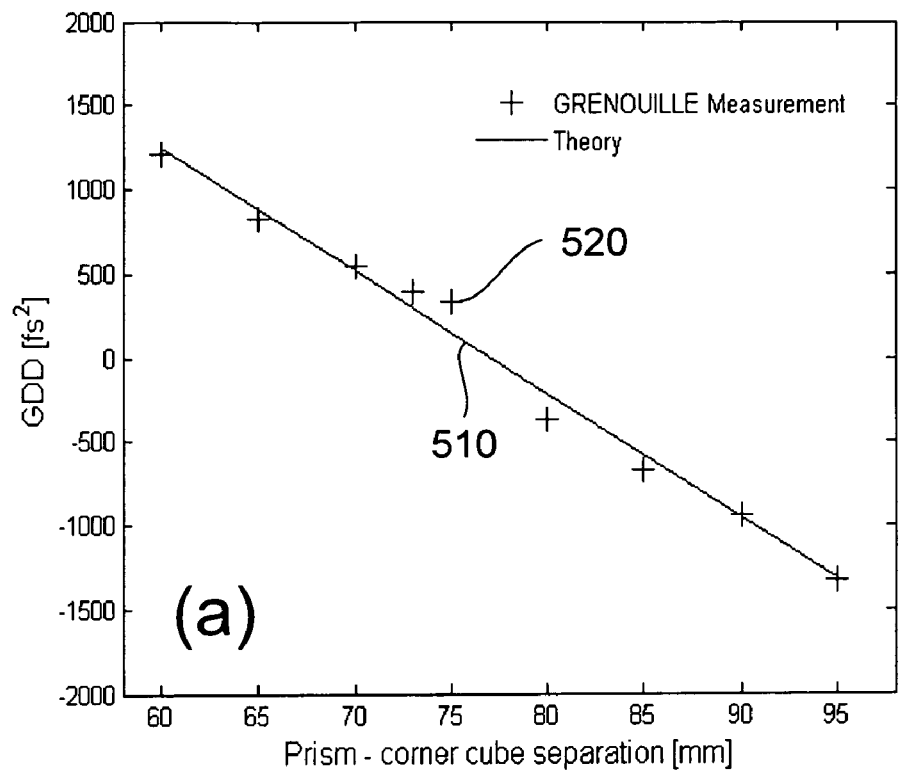
FIG. 5 shows the output GDD versus the separation of the prism and the corner cube separation for the pulse compressor shown in FIG. 1, where the single prism is formed of (a) PBH71 and (b) BK7, respectively.
Figure 5:
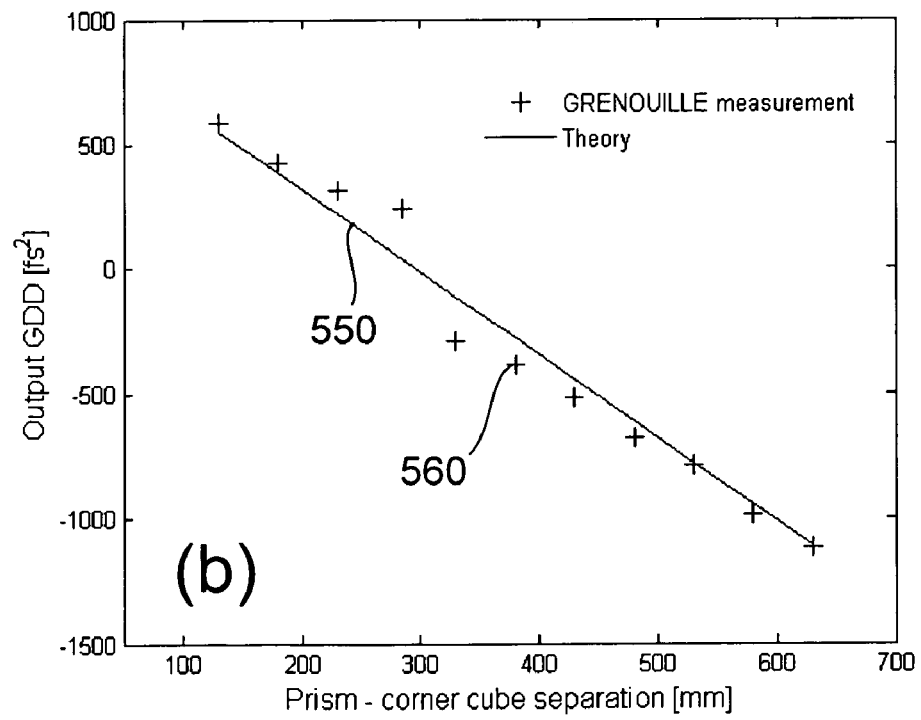

To evaluate these pulse compressors, Ti:Sapphire laser-oscillator pulses were used as the input beam of light and the intensity and phase of the pulses were measured using a Swamp Optics GRENOUILLE [30] before and after it passes through the pulse compressor. The GDD was measured as varying the separation of the prism and the corner cube. FIG. 5 shows the measured GDD at different prism-corner cube separations, as well as the theoretical GDD. FIG. 5a is for the pulse compressor with the PBH71 prism, where the theoretical and measured GDD data are represented by 510 and 520, respectively. FIG. 5b is for the pulse compressor with the BK7 prism, where the theoretical and measured GDD data are represented by 550 and 560, respectively. In both embodiments, the measured GDD data are in good agreement with theoretically predicted data. With the use of dispersive PBH71 prisms, one can compensate for 15,000 fs$^2$ GDD in about 30 cm of the prism-corner cube separation. This amount of the GDD is more than what is required by most multi-photon microscopes.

Additionally, the pulse compressor has yet another important property that makes it even more convenient to use. According to the embodiment of the single-prism pulse compressor shown in FIG. 1, the output beam of light is collinear to the input one.

Furthermore, if the input beam or the pulse compressor moves up, down, or sidewise, the output beam of light also moves in the same direction, and by the same amount. Thus bumping the pulse compressor should not bump the beam of light.

The present invention, among other things, discloses a pulse compressor having a single prism. The single prism pulse compressor is very compact in size, very easy to tune in wavelength and dispersion, and automatically yields zero angular dispersion, zero spatio-temporal distortions and unity magnification. Therefore, the invented pulse compressor may find broadly applications in ultrafast optics and related fields.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

LIST OF REFERENCES

[1]. E. Beaurepaire, L. Moreaux, F. Arnblard, and J. Mertz, Combined Scanning Optical Coherence and Two-Photon-Excited Fluorescence Microscopy. Optics Letters, 1999. 24(14), p. 969-971.

[2]. C. Buehler, K. H. Kim, C. Y. Dong, B. R. Masters, and P. T. C. So, Innova-tions in Two-Photon Deep Tissue Microscopy. IEEE Engineering in Medicine and Biology, 1999. 18(5), p. 23-30.

[3]. B. D. Butkus, Two-Photon Imaging Explores the Early Stages of Life. Bio-photonics International, 2003. 10(9), p. 38-41.

[4]. B. D. Butkus, Two-Photon Imaging Captures Immune Cell Motility in Vivo. Biophotonics International, 2003. 10(4), p. 59-61.

[5]. B. D. Butkus, Two-Photon and Confocal Microscopy Images Fret in Brain Tissue. Biophotonics International, 2003. 10(8), p. 54-56.

[6]. P. J. Campagnola, H. A. Clark, W. A. Mohler, A. Lewis, and L. M. Loew, Second-Harmonic Imaging Microscopy of Living Cells. Journal of Biomedical Optics, 2001. 6(3), p. 277-286.

[7]. M. L. Coleno, V. P. Wallace, C. H. Sun, A. K. Dunn, M. W. Berns, and B. J, Trornberg, Two-Photon Excited Imaging of Photosensitizers in Tissues. Proceedings of SPIE—The International Society for Optical Engineering Proceedings of the 1999 Optical Diagnostics of Living cells, Jan. 25-Jan. 26 1999, 1999. 3604: p. 67-73.

[8]. J. Wang, L. Ji, X.-S. Lin, and H. Ma, Tracking Deforming Aortas in Two-Photon Autofluorescence Images and Its Application on Quantitative Evaluation of Aorta-Related Drugs. Computerized Medical Imaging and Graphics, 2004. 28(1), p, 51-59.

[9]. N. White and R. Errington, Multi-Photon Microscopy: Seeing More by Imaging Less. BioTechniques, 2002, 33(2), p. 298-305

[10]. K. Furusawa, K. Takahashi, H. Kumagai, K. Midorikawa, and M. Obara, Ablation Characteristics of Au, Ag, and Cu Metals Using a Femtosecond Ti: Sapphire Laser. Applied Physics a-Materials Science & Processing, 1999. 69: p. S359-S66Springer Verlag.

[11]. S. W. Nolte, M.; Cumme, M.; Chichkov, B. N.; Tunnermann, A.; Korte, F.; Egbert, A. Sub-Micrometer Structuring of Metals with Femtosecond Laser Pulses. in Technical Digest of the Conference on Lasers and Electro-Optics. 2001.

[12]. M. S. Tank and G. H. Chapman, Micromachined Silicon Collimating Detector Array to View Objects in a Highly Scattering Medium. Canadian Journal of Electrical and Computer Engineering, 2000. 25(1), p. 13-18

[13]. J. N. Sweetser, J. L. Durant, and R. Trebino, Ultrafast Spectroscopy of High-Lying Excited States. Opt. Commun., 1998. 150: p. 180-184.

[14]. C. Brabec, G. Zerza, N. Sariciftci, G. Cerullo, G. Lanzani, S. de Silvestri, and J. Hummelen, Direct Observation of the Ultrafast Electron Transfer Process in a Polymer/Fullerene Blend, in Ultrafast Phenomena Xii, T. Elsaesser, S. Mukamel, M. Murnane, and N. Scherer, Editors. 2001, Springer. p. 589-591.

[15]. T. Kobayashi, Vibrational Dynamics in Molecules and Polymers Revealed by Sub-5-Fs Real-Time Spectroscopy, in Ultrafast Phenomena Xii, T. El-saesser, S. Mukamel, M. Murnane, and N. Scherer, Editors. 2001, Springer. p. 575-579.

[16]. S. Kumazaki, I. Ikegami, S. Yasuda, and K. Yoshihara, Ultrafast Charge Separation in the Plant Photosystem I Reaction Center, in Ultrafast Phe-nomena Xii, T. Elsaesser, S. Mukamel, M. Murnane, and N. Scherer, Edi-tors. 2001, Springer. p. 665-667.

[17]. C. Bardeen, V. Yakovlev, J. Squier, and K. Wilson, Quantum Control of Green Fluorescent Proteins by Using Chirped Femtosecond Pulses. J. Am. Chem, Soc., 1998. 120(13023-13027).

[18]. C. J. Bardeen, J. Che, K-R. Wilson, V. V-Yakovlev, P. Cong, B. Kohler, J. L. Krause, and M, Messina, Quantum Control of Nai Photodissociation Reaction Product States by Ultrafast Tailored Light Pulses. J. Phys, Chem. A, 1997. 101, p. 3815-3822.

[19]. T. Brixner, B. Kiefer, and G. Gerber, Problem Complexity in Femtosecond Quantum Control. Chemical Physics, 2001. 267(1-3), p. 241-246.

[20]. K. Hoki and Y. Fujimura, Quantum Control of Alignment and Orientation of Molecules by Optimized Laser Pulses. Chemical Physics, 2001. 267(1-3), p. 187-193.

[21]. J. Geremia, E. Weiss, and H. Rabitz, Achieving the Laboratory Control of Quantum Dynamics Phenomena Using Nonlinear Functional Maps. Chem. Phys., 2001. 267: p. 209-222.

[22]. G. Turinici and H. Rabitz, Quantum Wavefunction Controllability. Chemical Physics, 2001. 267(1-3), p. 1-9.

[23]. O. E. Martinez, J. P. Gordon, and R. L. Fork, "Negative group-velocity dispersion using refraction," J. Opt. Soc. Am. B 1(10), p. 1003-1006 (1984).

[24]. R. L. Fork, O. E. Martinez, and J. P. Gordon, "Negative dispersion using pair of prisms," Opt. Lett. 9(5), p. 150-152 (1984).

[25]. S. Akturk, X. Gu, P. Gabolde, and R. Trebino, "The general theory of first-order spatio-temporal distortions of Gaussian pulses and beams," Optics Express 13(21), p. 8642-8661 (2005).

[26]. M. Lai, S. T. Lai, and C. Swinger, "Single-grating laser pulse stretcher and compressor," Appl. Opt. 33(30), p. 6985-6987 (1993).

[27]. R. Trebino, "Achromatic N-prism beam expanders: optimal configurations," Appl. Opt. 24(8), p. 1130-1138 (1985).

[28]. S. Akturk, M. Kimmel, P. O'Shea, and R. Trebino, "Measuring pulse-front tilt in ultrashort pulses using GRENOUILLE," Optics Express 11, 491-501 (2003).

[29]. S. Akturk, M. Kimmel, P. O'Shea, and R. Trebino, "Measuring spatial chirp in ultrashort pulses using single-shot Frequency-Resolved Optical Gating," Optics Express 11, 68-78 (2003).

[30]. R. Trebino, Frequency-Resolved Optical Gating (Kluwer Academic Publishers, Boston, 2002).

What is claimed is:

1. A pulse compressor, comprising:
 a. a prism having a first end, an opposite, second end, and a body portion defined therebetween, wherein the body portion has at least a first surface and a second surface defining an angle, $\alpha$, therebetween;
 b. a corner cube positioned to face the second surface of the body portion of the prism; and
 c. a periscope positioned to face the first surface of the body portion of the prism, wherein the prism, the corner cube and the periscope are arranged such that when an input beam of light along a first optical path is received and dispersed by the prism to form a first dispersed beam of light that is away from the second surface and along a second optical path towards the corner cube, the first dispersed beam of light along the second optical path is received and returned by the corner cube to form a first reversed beam of light that is along a third optical path towards the second surface, the first reversed beam of light along the third optical path is received and dispersed by the prism to form a second dispersed beam of light that is away from the first surface and along a fourth optical path towards the periscope, the second dispersed beam of light along the fourth optical path is received and directed by the periscope to form a returned beam of light along a fifth optical path towards the first surface, the returned beam of light along the fifth optical path is received and dispersed by the prism to form a third dispersed beam of light that is away from the second surface and along a sixth optical path towards the corner cube, the third dispersed beam of light along the sixth optical path is received and returned by the corner cube to form a second reversed beam of light that is along a seventh optical path towards the second surface, and the second reversed beam of light along the seventh optical path is received and dispersed by the prism to form an output beam of light along an eighth optical path.

2. The pulse compressor of claim 1, wherein the input beam of light comprises one or more pulses of light, wherein the one or more pulses of light has a bandwidth of wavelengths.

3. The pulse compressor of claim 2, wherein each of the input beam of light and the output beam of light has a corresponding pulse length, wherein the pulse length of the output beam of light can be same as or different from that of the input beam of light.

4. The pulse compressor of claim 3, wherein the output beam of light has zero additional angular dispersion, zero additional spatio-temporal distortions and unity magnification, relative to the input beam of light.

5. The pulse compressor of claim 1, wherein the prism is made of a dispersive material and adapted for receiving a beam of light along an incident optical path and dispersing it into its constituent spectral colors to form a dispersed beam of light along an output optical path.

6. The pulse compressor of claim 5, wherein the prism has an apex edge defined by the first surface and the second surface, and an axis parallel to the first and second surfaces and the apex edge.

7. The pulse compressor of claim 6, wherein each of the first surface and the second surface of the prism is at least partially coated with an anti-reflection material.

8. The pulse compressor of claim 1, wherein the prism is rotatable around its axis for wavelength tuning.

9. The pulse compressor of claim 1, wherein the angle, α, therebetween the first surface and the second surface is in the range of 0 to 180°.

10. The pulse compressor of claim 1, wherein the corner cube is adapted for receiving a beam of light along an incident optical path and returning it in a spatially reverse order of colors to form a reversed beam of light along an output optical path that is anti-parallel to the incident optical path and translatable for tuning of group delay dispersion.

11. The pulse compressor of claim 1, wherein the periscope is adapted for receiving a beam of light along an incident optical path and returning it to form a returned beam of light along an output optical path that is anti-parallel to the incident optical path, wherein the beam of light and the returned beam of light have the same spatial order of colors.

12. The pulse compressor of claim 11, wherein the periscope comprises a pair of mirrors.

13. The pulse compressor of claim 11, wherein the periscope comprises a roof mirror reflector.

14. The pulse compressor of claim 1, further comprising a mirror adapted for receiving the beam of light and reflecting it along the first optical path towards the prism.

15. The pulse compressor of claim 1, further comprising a collimating member having a first mirror, a second mirror and a third mirror arranged such that when the input beam of light or pulse compressor moves, the input beam of light and the output beam of light remain collinear accordingly.

16. A pulse compressor, comprising:
an optical medium adapted for receiving a beam of light in an incident optical path and dispersing it into its constituent spectral colors to form a dispersed beam of light in an output optical path, wherein the optical medium is configured such that when an incident beam of light is received by the optical medium, it passes through the optical medium four times, in a back and forth manner, and leaves the optical medium in the form of a corresponding output beam of light, a beam inversion member positioned on the output optical path of the optical medium for receiving the dispersed beam of light of the optical medium and returning it in a spatially reverse order of the spectral colors along an optical path towards the optical medium, wherein the optical path is anti-parallel to the output optical path of the optical medium, and a periscope arranged such that the optical medium is positioned between the periscope and the beam reversion member.

17. The pulse compressor of claim 16, wherein the periscope comprises at least one mirror for returning an incident beam of light.

18. The pulse compressor of claim 16, wherein the optical medium is formed of a dispersive material.

19. The pulse compressor of claim 18, wherein the optical medium is a prism.

20. The pulse compressor of claim 16, wherein the input beam of light comprises one or more pulses of light, wherein the one or more pulses of light has a bandwidth of wavelengths.

21. The pulse compressor of claim 20, wherein each of the input beam of light and the output beam of light has a corresponding pulse length, wherein the pulse length of the output beam of light can be same as or different from that of the input beam of light.

22. The pulse compressor of claim 21, wherein the output beam of light has zero additional angular dispersion, zero additional spatio-temporal distortions and unity magnification, relative to the input beam of light.

23. A method for pulse compression, comprising the steps of:
a. providing an optical medium capable of receiving a beam of light along an incident optical path and dispersing it into its constituent spectral colors to form a dispersed beam of light along an output optical path, wherein the optical medium is configured such that when an incident beam of light is received by the optical medium, it passes through the optical medium four times, in a back and forth manner, and leaves the optical medium in the form of a corresponding output beam of light; and b. inputting a beam of light to the optical medium along an incident optical path so as to obtain a corresponding output beam of light, reversing a dispersed beam of light formed by the optical medium in a spatially reverse order to form a reversed beam of light along an optical path towards the optical medium, wherein the optical path is anti-parallel to the output optical path of the optical medium, wherein a periscope is arranged such that the optical medium is positioned between the periscope and a beam reversion member.

24. The method of claim 23, wherein the optical medium is formed of a dispersive material.

25. The method of claim 24, wherein the optical medium comprises a prism.

26. The method of claim 23, wherein the input beam of light comprises one or more pulses of light, wherein the one or more pulses of light has a bandwidth of wavelengths.

27. The method of claim 26, wherein each of the input beam of light and the output beam of light has a corresponding pulse length, wherein the pulse length of the output beam of light can be same as or different from that of the input beam of light.

28. The method of claim 27, wherein the output beam of light has zero additional angular dispersion, zero additional spatio-temporal distortions and unity magnification, relative to the input beam of light.

29. A pulse compressor, comprising:
a. a prism having at least a first surface and a second surface defining an angle, $\alpha$, therebetween and adapted for receiving a beam of light in an incident optical path and dispersing it into its constituent spectral colors to form a dispersed beam of light in an output optical path;
b. a corner cube positioned to face the second surface of the prism and adapted for receiving a beam of light along an incident optical path and returning it in a spatially reverse order of colors to form a reversed beam of light along an output optical path that is anti-parallel to the incident optical path; and
c. a beam reflector positioned to face the first surface of the prism and adapted for receiving a beam of light along an incident optical path and returning it to form a returned beam of light along an output optical path that is anti-parallel to the incident optical path, wherein the beam of light and the returned beam of light have the same spatial order of colors, wherein the prism, the corner cube and the beam reflector are arranged such that when an input beam of light is incident on the first surface of the prism, it propagates through the prism, the corner cube and the beam reflector and is output from the first surface of the prism in the form of an output beam of light that has zero additional angular dispersion, zero additional spatio-temporal distortions and unity magnification, relative to the input beam of light.

30. The pulse compressor of claim 29, wherein each of the input beam of light and the output beam of light has a corresponding pulse length, wherein the pulse length of the output beam of light can be same as or different from that of the input beam of light.

31. The pulse compressor of claim 29, wherein the prism is made of a dispersive material.

32. The pulse compressor of claim 29, wherein the prism has an apex edge defined by the first surface and the second surface, and an axis parallel to the first and second surfaces and the apex edge.

33. The pulse compressor of claim 32, wherein the prism is rotatable around its axis for wavelength tuning.

34. The pulse compressor of claim 29, wherein the corner cube is translatable for tuning of group delay dispersion.

35. The pulse compressor of claim 29, wherein the beam reflector comprises a pair of mirrors.

36. The pulse compressor of claim 29, wherein the beam reflector comprises a roof mirror reflector.

37. The pulse compressor of claim 29, further comprising a mirror adapted for receiving a beam of light and reflecting it along an optical path towards the first surface of the prism.

38. The pulse compressor of claim 37, further comprising a beam periscope adapted for receiving a beam of light and directing it along an optical path towards the mirror.

* * * * *